US012610929B2

(12) United States Patent
Chen et al.

(10) Patent No.: US 12,610,929 B2
(45) Date of Patent: Apr. 28, 2026

(54) BRAKE MECHANISM, BAIT CASTING REEL, AND FISHING TACKLE

(71) Applicant: Shenzhen Bosaidong Technology Co., Ltd., Shenzhen (CN)

(72) Inventors: Hong Chen, Shenzhen (CN); Yunting Zhang, Shenzhen (CN); Tianshi Cui, Shenzhen (CN)

(73) Assignee: Shenzhen Bosaidong Technology Co., Ltd., Shenzhen (CN)

( * ) Notice: Subject to any disclaimer, the term of this patent is extended or adjusted under 35 U.S.C. 154(b) by 128 days.

(21) Appl. No.: 18/602,025

(22) Filed: Mar. 12, 2024

(65) Prior Publication Data

US 2025/0176518 A1     Jun. 5, 2025

(30) Foreign Application Priority Data

Nov. 30, 2023     (CN) ......................... 202311646408.1

(51) Int. Cl.
A01K 89/01 (2006.01)
A01K 89/033 (2006.01)
(52) U.S. Cl.
CPC .................................. A01K 89/051 (2015.05)
(58) Field of Classification Search
CPC .................... A01K 89/01555; A01K 89/01557
See application file for complete search history.

(56) References Cited

U.S. PATENT DOCUMENTS

| 4,601,438 A | * | 7/1986 | Young | .............. A01K 89/01555 |
| | | | | 310/105 |
| 2021/0329898 A1 | * | 10/2021 | Chen et al. | .......... A91K 89/056 |
| | | | | 242/288 |
| 2022/0174926 A1 | * | 6/2022 | Huang | ................. A01K 89/051 |
| 2023/0116392 A1 | * | 4/2023 | Zhang | .............. A01K 89/01555 |
| | | | | 242/288 |

FOREIGN PATENT DOCUMENTS

| CN | | 103416375 A | * | 12/2013 | ....... A01K 89/01555 |
| JP | | 11253081 A | * | 9/1999 | ....... A01K 89/01557 |

* cited by examiner

*Primary Examiner* — Emmanuel M Marcelo

(57) ABSTRACT

Disclosed is a brake mechanism, including: a wire wheel; and a magnetic brake assembly disposed at one end of the wire wheel and including a magnet assembly and a centrifugal adjustment assembly, where the magnet assembly is configured to generate a magnetic induction line, and the centrifugal adjustment assembly is configured to automatically adjust a distance between the magnet assembly and an end surface of the wire wheel based on a rotational speed of the wire wheel to adjust a range of the wire wheel cutting the magnetic induction line, to automatically adjust a braking force, thereby providing different braking forces, so that the rotational speed of the wire wheel may be automatically fine-tuned to maintain a dynamic balance with the braking force, thereby reducing a probability that a fishing line birds nest occurs. In addition, the present application further discloses a bait casting reel and a fishing tackle.

17 Claims, 8 Drawing Sheets

1

1

20

20

1

211
213
102
10
222
223
101

100

30

1

2

100

211
212
213

102

BRAKE MECHANISM, BAIT CASTING REEL, AND FISHING TACKLE

CROSS REFERENCE TO RELATED APPLICATION

The present application claims the benefit of Chinese Patent Application No. 202311646408.1 filed on Nov. 30, 2023, the contents of which are incorporated herein by reference in their entirety.

TECHNICAL FIELD

The present application relates to the field of fishing tackles, and more specifically, to a brake mechanism, a bait casting reel, and a fishing tackle.

BACKGROUND

A fishing reel is one of necessary fishing tackles for casting (sea) pole fishing. At present, most brake structures of the fishing reel of fishing tackles adopt magnetic brake structures. In a casting process of the fishing reel, a wire wheel rotates at high speed due to a tug of a fast-flying bait. The high-speed wire wheel cuts magnetic lines of force around a magnet in a magnetic brake structure to generate an induced current, thereby generating a resistance force, which is commonly known as a braking force, in an opposite direction to the movement of the wire wheel when cutting the magnetic lines, to prevent a fishing line birds nest due to excessive acceleration of the wire wheel, causing a rotational speed of the wire wheel to greatly exceed a flight speed of the bait. However, an existing magnetic brake structure can only achieve a constant braking force in the casting process. That is, when a user adjusts a magnetic brake knob to a certain gear, only the acceleration of the wire wheel can affect a change in a resistance force between the wire wheel and a magnet. Such simple wire wheel damping intervention often causes a fishing line birds nest to a same fishing reel in different casting conditions such as different casting skills of users, different casting strength, and/or different bait weights. Especially for beginners, a probability that the fishing line birds nest occurs is higher.

SUMMARY

The technical problem to be resolved in the present application is to provide a brake mechanism, a bait casting reel, and a fishing tackle that can automatically adjust a braking force based on a rotational speed of a wire wheel during rotation of the wire wheel.

To resolve the foregoing technical problem, according to an aspect of the present application, a brake mechanism is provided, including:

a wire wheel; and a magnetic brake assembly, disposed at one end of the wire wheel, and including a magnet assembly and a centrifugal adjustment assembly, where the magnet assembly is configured to generate a magnetic induction line, and the centrifugal adjustment assembly is configured to automatically adjust a distance between the magnet assembly and an end surface of the wire wheel based on a rotational speed of the wire wheel to adjust a range of the wire wheel cutting the magnetic induction line, to automatically adjust a braking force.

In a further technical solution, the centrifugal adjustment assembly includes an elastic member and a cam, the magnet assembly includes a magnet base, a hollow magnet frame, and a magnet disposed on the magnet frame, at least one sliding groove is provided on a top surface of the magnet base, the cam is disposed in a lower middle part of the magnet base, and a convex part of the cam abuts against an inner wall of the magnet frame, an upper part of the magnet frame is movably disposed in the sliding groove through the elastic member, so that the magnet frame moves along the convex part of the cam under an action of an electromagnetic force or an elastic force of the elastic member when the wire wheel rotates, causing the magnet to move in a direction close to or away from the end surface of the wire wheel.

In a further technical solution, the cam is a spiral cam, at least one connecting post is provided on the top of the magnet frame, each connecting post is located in one sliding groove and is movable in the sliding groove, one end of the elastic member is connected to a side wall of the sliding groove, and another end is connected to the connecting post, the inner wall of the magnet frame is provided with a connection groove that matches a contour of the convex part of the cam, so that a groove wall of the connection groove moves along an edge of the convex part when the magnet frame rotates under the action of the electromagnetic force or the elastic force of the elastic member.

In a further technical solution, a quantity of the elastic members, the connecting posts, and the sliding grooves are all three, the three sliding grooves are disposed around a center of a circle of the magnet base, and each connecting post is movably disposed in one sliding groove through the elastic member.

In a further technical solution, the magnet assembly further includes at least one magnet suction piece, the magnet suction piece is fixed on the magnet frame and attracted to the top of the magnet.

In a further technical solution, the magnet suction piece includes an attracting part, two extension plates formed by extending upward from both ends of the attracting part, and two mounting plates formed by bending outward from outer sides of the extension plates, the magnet frame is provided with at least one mounting groove, the attracting part of the magnet suction piece passes through the mounting groove and is attracted to the top of the magnet, and the two mounting plates are located on a top surface of the magnet frame.

In a further technical solution, the centrifugal adjustment assembly further includes a cam cover, the magnet base includes a base body and a connecting body extending downward from the middle of one side of the base body, the sliding groove is provided on the base body, the cam is located on the connecting body, and the cam cover is provided on the cam and is fixed on the connecting body through screws.

In a further technical solution, the brake mechanism further includes a side cover assembly, where the magnetic brake assembly is disposed on the side cover assembly, and a rotating shaft of the wire wheel passes through the magnet assembly and is disposed in the side cover assembly.

To resolve the foregoing technical problem, according to another aspect of the present application, a bait casting reel is provided, including a fishing reel main body and a brake mechanism connected to the fishing reel main body, where the brake mechanism is the foregoing brake mechanism.

To resolve the foregoing technical problem, according to another aspect of the present application, a fishing tackle is provided, including the bait casting reel.

Compared with the conventional technology, in the present application, the centrifugal adjustment assembly automatically adjusts the distance between the magnet assembly and the end surface of the wire wheel based on the rotational speed of the wire wheel, so that the magnet assembly may move in an axial direction, close to or away from the end surface of the wire wheel, to control the intensity of the magnetic induction line near the end surface of the wire wheel, thereby adjusting a range of the end surface of the wire wheel cutting the magnetic induction line and implementing an objective of automatically adjusting the braking force. It can be learned that, in the present application, when the wire wheel rotates, the magnetic induction line may be cut through the end surface of the wire wheel, and the distance between the magnet assembly and the end surface of the wire wheel is variable. In a casting process, the distance between the magnet assembly and the end surface of the wire wheel may be changed based on the rotational speed of the wire wheel, thereby providing different braking forces, so that the rotational speed of the wire wheel may be automatically fine-tuned to maintain a dynamic balance with the braking force, thereby reducing a probability that a fishing line birds nest occurs.

DETAILED DESCRIPTION

Figure 1:
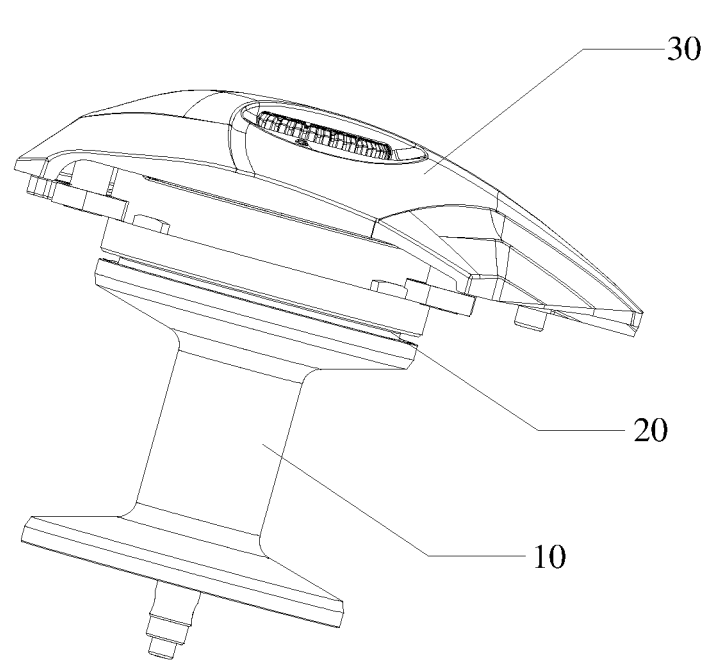
FIG. 1 is a three-dimensional schematic structural diagram of a brake mechanism according to a specific embodiment of the present application.
Figure 2:
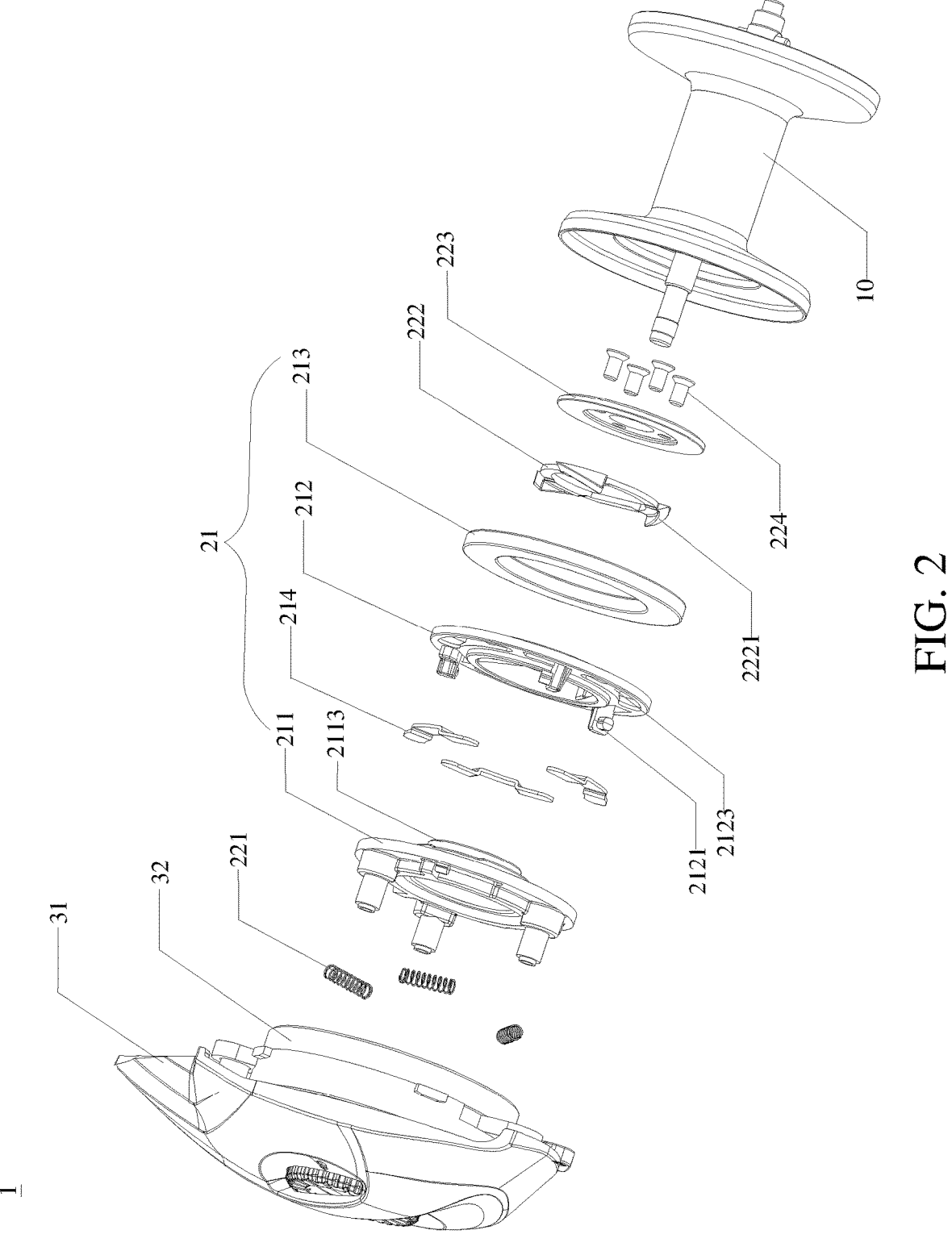
FIG. 2 is a schematic diagram of an exploded structure of the brake mechanism shown in FIG. 1.
Figure 3:
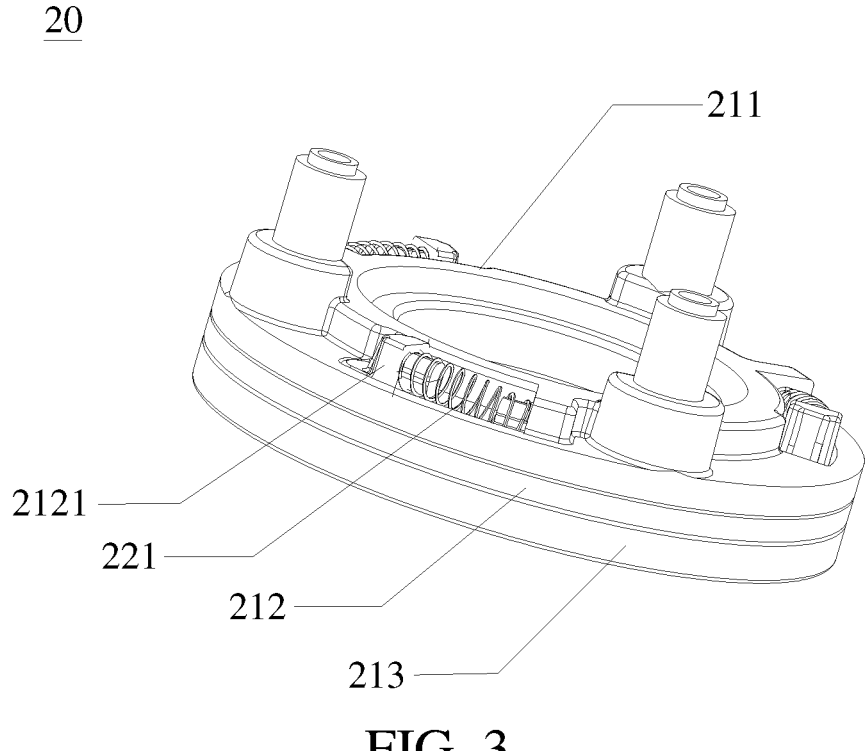
FIG. 3 is a schematic diagram of a specific structure of a magnetic brake assembly in the brake mechanism shown in FIG. 1.
Figure 4:
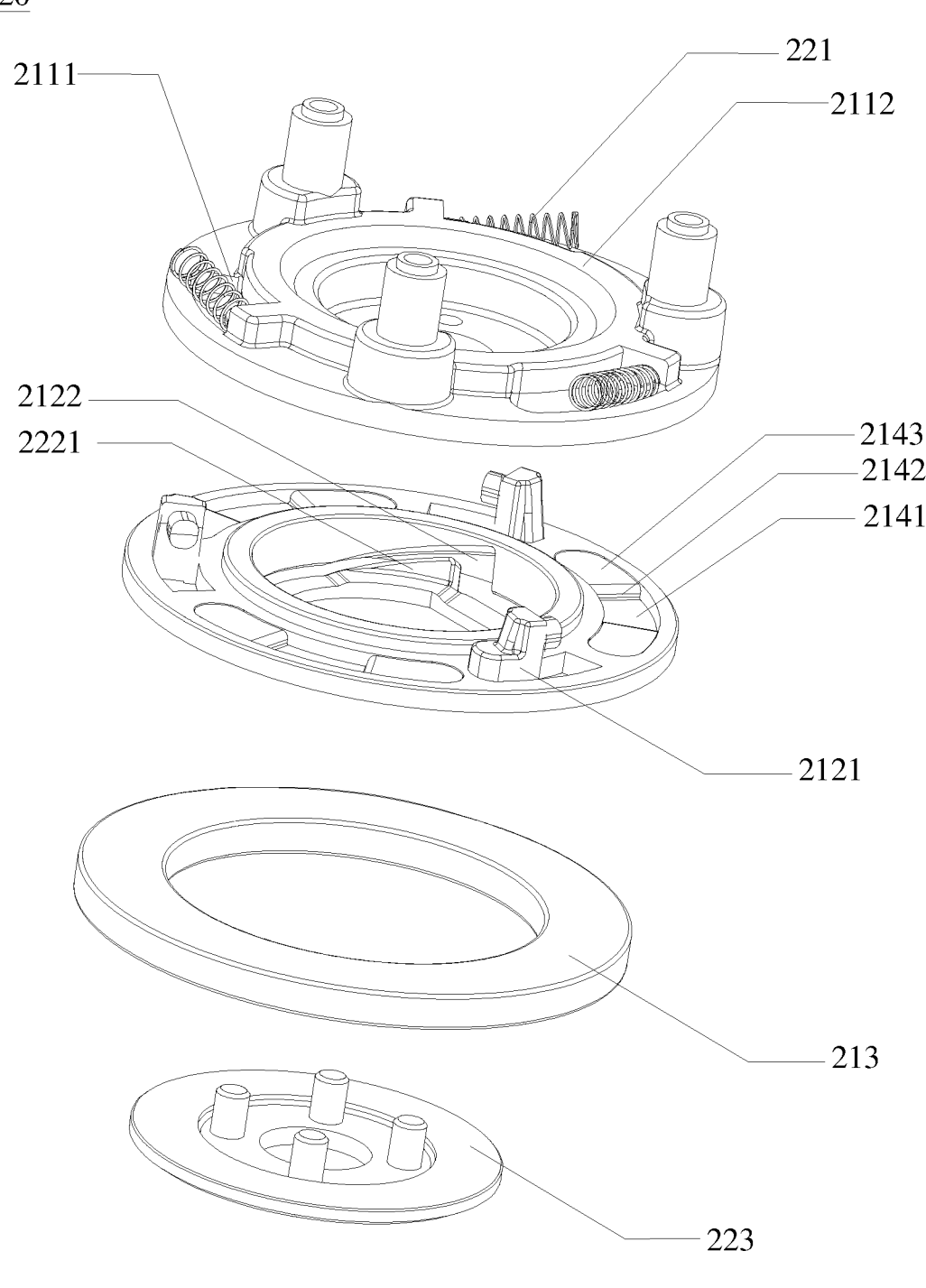
FIG. 4 is a schematic diagram of an exploded structure of the magnetic brake assembly shown in FIG. 3.

To enable a person of ordinary skill in the art to more clearly understand the objective, technical solutions, and advantages of the present application, the present application is further described below with reference to the accompanying drawings and the embodiments.

Referring to FIG. 1 to FIG. 5, FIG. 1 to FIG. 5 show a brake mechanism 1 according to a specific embodiment of the present application. In embodiments shown in the accompanying drawings, the brake mechanism 1 includes a wire wheel 10 and a magnetic brake assembly 20 disposed at one end of the wire wheel 10, where the magnetic brake assembly 20 includes a magnet assembly 21 and a centrifugal adjustment assembly, the magnet assembly 21 is configured to generate a magnetic induction line, and the centrifugal adjustment assembly is configured to automatically adjust a distance between the magnet assembly 21 and an end surface 102 of the wire wheel 10 based on a rotational speed of the wire wheel 10 to adjust a range of the wire wheel 10 cutting the magnetic induction line, thereby automatically adjusting a braking force. Based on the foregoing design, in the present application, when the wire wheel 10 rotates, the brake mechanism 1 may change the distance between the magnet assembly 21 and the end surface 102 of the wire wheel 10 based on the rotational speed of the wire wheel 10, so that the distance between the magnet assembly 21 and the end surface 102 of the wire wheel 10 is variable. That is, the magnet assembly 21 may move in an axial direction under an action of the centrifugal adjustment assembly, close to or away from the end surface 102 of the wire wheel 10, to control the intensity of the magnetic induction line near the end surface 102 of the wire wheel 10, so that a range of the end surface 102 of the wire wheel 10 cutting the magnetic induction line may be adjusted, and the braking force may be automatically adjusted. In this way, the rotational speed of the wire wheel 10 may be automatically fine-tuned to maintain a dynamic balance with the braking force, thereby reducing a probability that a fishing line birds nest occurs.

In some embodiments, the centrifugal adjustment assembly includes an elastic member 221 and a cam 222, the magnet assembly 21 includes a magnet base 211, a hollow magnet frame 212, and a magnet 213 disposed on the magnet frame 212, at least one sliding groove 2111 is provided on a top surface of the magnet base 211, the cam 222 is disposed in a lower middle part of the magnet base 211, and a convex part 2221 of the cam 222 abuts against an inner wall of the magnet frame 212, an upper part of the magnet frame 212 is movably disposed in the sliding groove 2111 through the elastic member 221, so that the magnet frame 212 moves along the convex part 2221 of the cam 222 under an action of an electromagnetic force or an elastic force of the elastic member 221 when the wire wheel 10 rotates, thereby causing the magnet 213 to move in a direction close to or away from the end surface 102 of the wire wheel 10. Preferably, in this embodiment, the cam 222 is a spiral cam, that is, the convex part 2221 of the cam 222 is disposed in a spiral shape in an axis direction. In the present application, when the brake mechanism 1 is assembled into a body of a fishing reel for use and in a casting process, the wire wheel 10 rotates at high speed due to a tug of a fast-flying bait, and the wire wheel 10 receives a Loren magnetic force (braking force) in an opposite rotation direction of the wire wheel 10 due to the magnetic induction with the magnet 213. Under an action of the braking force, the rotational speed of the wire wheel 10 is attenuated. In this process, according to Newton's third law, when the wire wheel 10 is received by the Loren magnetic force, the magnet 213 also receive a reactive force, and the reactive force comes from an electromagnetic force from the wire wheel 10 and is opposite to a direction of the Loren magnetic force. Under an action of the electromagnetic force, the magnet 213 tends to follow the movement of the wire wheel 10. Since the magnet 213 is disposed on the magnet frame 212, the upper part of the magnet frame 212 is movably disposed in the sliding groove 2111 of the magnet base 211 through the elastic member 221, and the lower middle part of the magnet frame 212 is also provided with a cam 222 that matches the inner wall of the magnet frame 212, when the electromagnetic force received by the magnet 213 is greater than the thrust of the elastic member 221, the upper part of the magnet frame 212 may move in the sliding groove 2111, and through the cooperation between the inner wall of the magnet frame 212 and the convex part 2221 of the cam 222, the magnet frame 212 may be moved along a trajectory of the convex part 2221, causing axial displacement, so that the magnet 213 is driven by the magnet frame 212 to move in a direction close to the end surface 102 of the wire wheel 10. That is, as the speed of the wire wheel 10 increases, the magnet 213 gradually approaches the end surface 102 of the wire wheel 10, the magnetic induction intensity (magnetic flux density) between the magnet 213 and the end surface 102 of the wire wheel 10 increases accordingly, and the braking force increases accordingly, which provides a greater braking force, plays a restraining and buffering role in the rotation of the wire wheel 10, and slows down the rotational speed of the wire wheel 10, thereby effectively preventing that the fishing line birds nest occurs due to the excessive rotation of the wire wheel 10. In a latter stage of the casting, the rotational speed of the wire wheel 10 slows down, the braking force decreases, and the electromagnetic force received by the magnet 213 also decreases. When the electromagnetic force weakens to less than the thrust of the elastic member 221, the magnet frame 212 moves in the opposite direction along the trajectory of the convex part 2221, drives the magnet 213 away from the end surface 102 of the wire wheel 10, and finally returns to an original position. The intensity of the magnetic induction line that can be cut by the end surface 102 of the wire wheel 10 is weakened, so that the braking force is reduced and a casting distance is increased.

Still referring to FIG. 2 to FIG. 5, in some embodiments, at least one connecting post 2121 is provided on the top of the magnet frame 212, each connecting post 2121 is located in one sliding groove 2111 and is movable in the sliding groove 2111, one end of the elastic member 221 is connected to a side wall of the sliding groove 2111, and another end is connected to the connecting post 2121, the inner wall of the magnet frame 212 is provided with a connection groove 2122 that matches a contour of the convex part 2221 in the cam 222, so that a groove wall of the connection groove 2122 moves along an edge of the convex part 2221 when the magnet frame 212 rotates under the action of the electromagnetic force or the elastic force of the elastic member 221. Based on the foregoing design, with reference to FIG. 3 and FIG. 5, when the electromagnetic force received by the magnet 213 increases to be greater than a thrust of the elastic member 221, the magnet frame 212 rotates under the action of the electromagnetic force, and the groove wall of the connection groove 2122 of the magnet frame 212 gradually moves downward along a contour edge of the convex part 2221, so that the magnet 213 is close to the end surface 102 of the wire wheel 10. However, when the electromagnetic force received by the magnet 213 is reduced to less than the thrust of the elastic member 221, the magnet frame 212 rotates in an opposite direction under the action of elastic force, and the groove wall of the connection groove 2122 of the magnet frame 212 gradually moves upward along the contour edge of the convex part 2221, so that the magnet 213 gradually moves away from the end surface 102 of the wire wheel 10.

Specifically, in this embodiment, a quantity of the elastic members 221, the connecting posts 2121, and the sliding grooves 2111 are all three, the three sliding grooves 2111 are disposed around a center of a circle of the magnet base 211, each connecting post 2121 is movably disposed in one sliding groove 2111 through the elastic member 221, and the elastic member 221 is a spring. Preferably, the magnet 213 is an annular magnet, the centrifugal adjustment assembly further includes a cam cover 223, the magnet base 213 includes a base body 2112 and a connecting body 2113 extending downward from the middle of one side of the base body 2112, the sliding groove 2111 is provided on the base body 2112, the cam 222 is located on the connecting body 2113, and the cam cover 223 is provided on the cam 222 and is fixed on the connecting body 2113 through screws 224.

Further, in this embodiment, the magnet assembly 21 further includes three magnet suction pieces 214, each of the magnet suction pieces 214 is fixed on the magnet frame 212 and attracted to the top of the magnet 213. The magnet suction piece 214 includes an attracting part 2141, two extension plates 2142 formed by extending upward from both ends of the attracting part 2141, and two mounting plates 2143 formed by bending outward from outer sides of the extension plates 2142, the magnet frame 212 is provided with three mounting grooves 2123, the attracting part 2141 of each of the magnet suction pieces 214 passes through the mounting groove 2123 and is attracted to the top of the magnet 213, and the two mounting plates 2143 are located on a top surface of the magnet frame 212. In this embodiment, in each of the magnet suction pieces 214, the two mounting plates 2143 are located on both sides of the mounting groove 2123. Preferably, contact parts between the top of the magnet frame 212 and the mounting plates 2143 are recessed downward to form a groove for placing the mounting plates 2143.

In some embodiments, the brake mechanism 1 further includes a side cover assembly 30, where the magnetic brake assembly 20 is disposed on the side cover assembly 30, and a rotating shaft of the wire wheel 10 passes through the magnet assembly 21 and is disposed in the side cover assembly 30. Specifically, the side cover assembly 30 includes a side cover main body 31 and a wire wheel base 32 connected to the side cover main body 31, and the rotating shaft 101 of the wire wheel 10 passes through the magnet assembly 21 and is located in the wire wheel base 32.

Figure 5:
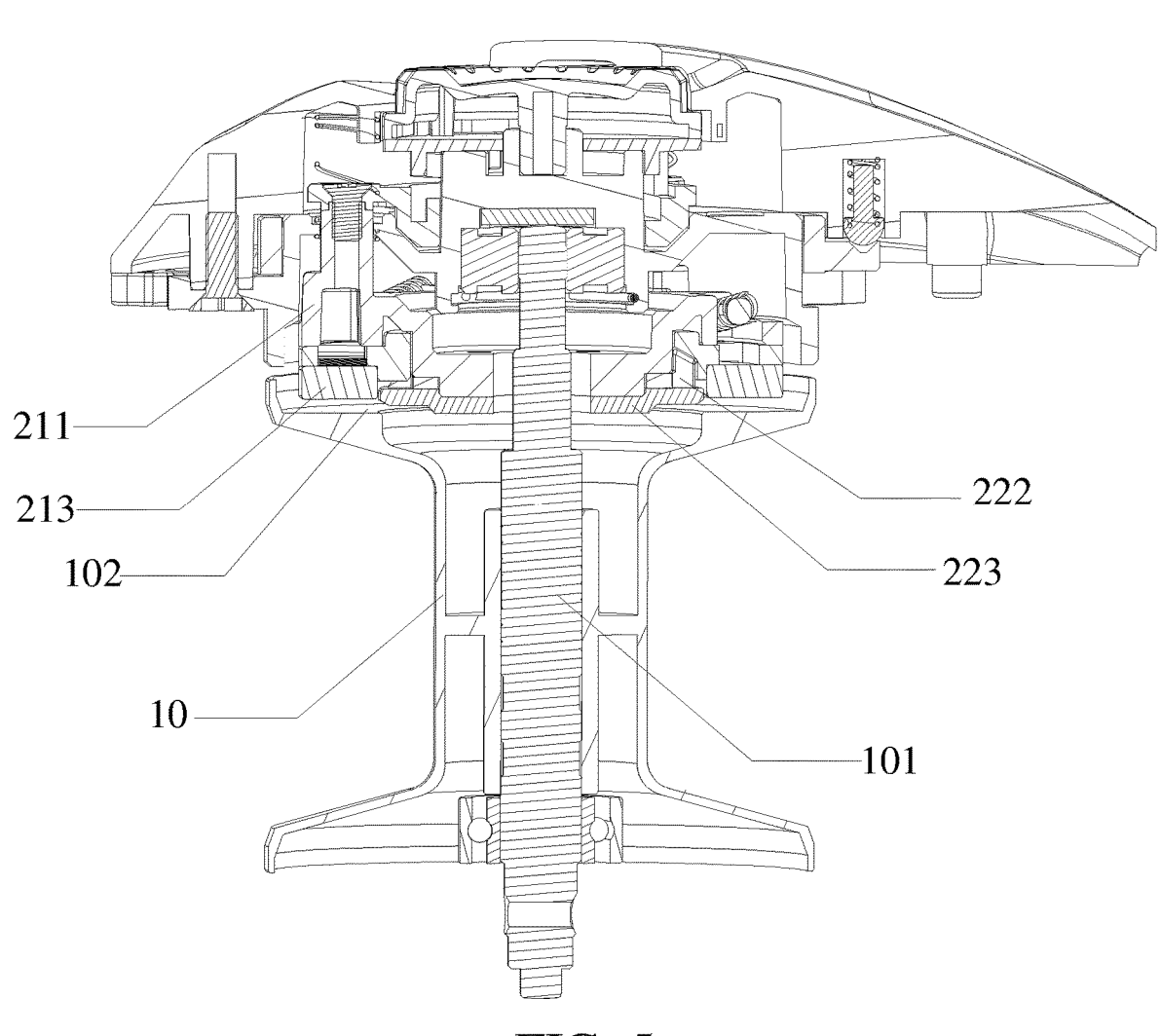
FIG. 5 is a schematic cross-sectional view of the brake mechanism according to the present application shown in FIG. 1.

It may be understood that, initially, in the present application, a set distance is maintained between the magnet 213 and the end surface 102 of the wire wheel 10. In the early part of the casting process, when the wire wheel 10 rotates rapidly, the annular magnet 213 tends to follow the rotation of the wire wheel 10 under an action of the electromagnetic force that is opposite to the Loren magnetic force. When the electromagnetic force received by the magnet 213 is greater than the thrust of the elastic member 221, the connecting post 2121 of the magnet frame 212 is movable in the sliding groove 2111, driving the magnet frame 212 to rotate as a whole. While rotating, through the cooperation between the groove wall of the connection groove 2122 of the magnet frame 212 and the contour of the convex part 2221 that matches the groove wall of the connection groove 2122 of the magnet frame 212, so that the magnet frame 212 as a whole gradually moves downward along the edge of the convex part 2221, and the magnet 213 attracted to the magnet frame 212 is close to the end surface 102 of the wire wheel 10 (as shown in FIG. 5). In this way, the intensity of the magnetic induction line that can be cut by the end surface 102 of the wire wheel 10 is enhanced, thereby providing a greater braking force to effectively prevent that the fishing line birds nest occurs due to excessive rotation of the wire wheel 10. In a latter stage of the casting process, as the rotational speed of the wire wheel 10 slowly decreases, the electromagnetic force received by the magnet 213 also gradually decreases. When the electromagnetic force is reduced to less than the thrust of the elastic member 221, the connecting post 2121 moves in the opposite direction under the action of the elastic force, driving the magnet frame 212 as a whole to rotate in the opposite direction. While rotating in the opposite direction, through the cooperation between the groove wall of the connection groove 2122 of the magnet frame 212 and the contour of the convex part 2221 that matches the groove wall of the connection groove 2122 of the magnet frame 212, the magnet frame 212 as a whole gradually moves upward along the edge of the convex part 2221, and the magnet 213 gradually moves in a direction away from the end surface 102 of the wire wheel 10. In this way, the intensity of the magnetic induction line that can be cut by the end surface 102 of the wire wheel 10 is weakened, thereby reducing the braking force, slowing down the decline of the rotational speed of the wire wheel 10, and increasing the casting distance. It may be learned that, in the present application, the brake mechanism 1 may automatically fine-tune the rotational speed of the wire wheel 10 through the magnetic brake assembly 20 to maintain a dynamic balance with the braking force, thereby extremely effectively reducing or even avoiding the occurrence of a fishing line birds nest. In this way, even novice fishermen do not have to worry too much about fishing troubles caused by too much fishing line birds nest due to unskilled casting skills. For experienced fishermen who are skilled in the casting skills, whether swing casting or over-casting, the experienced fishermen can cope with ease, so that the experienced fishermen can feel more confident and enjoy fishing at will.

Figure 6:
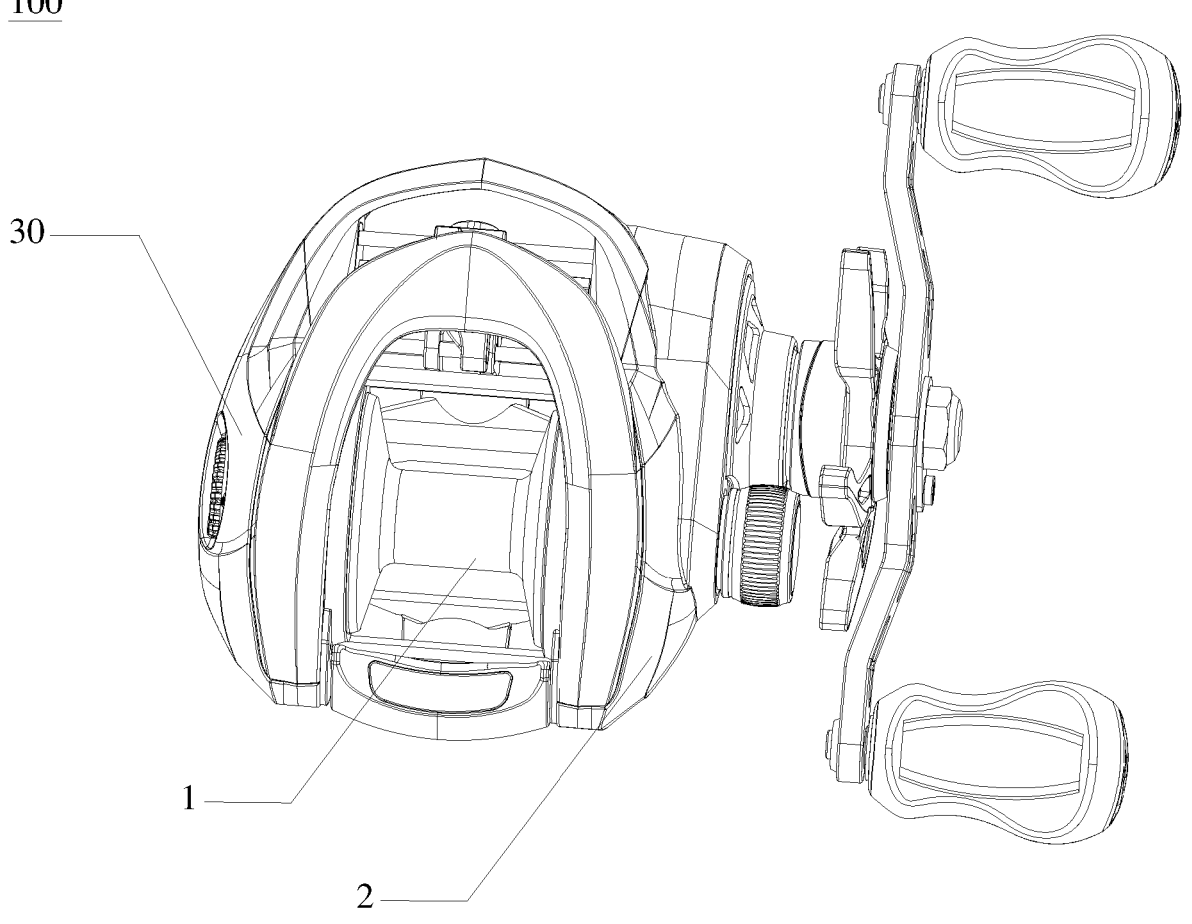
FIG. 6 is a schematic structural diagram of a bait casting reel according to a specific embodiment.

Referring to FIG. 6, FIG. 6 is a bait casting reel 100 according to a specific embodiment of the present application. In the embodiments shown in the accompanying drawings, the bait casting reel 100 includes a fishing reel main body 2 and the brake mechanism 1 according to the foregoing embodiment. The wire wheel 10 and the magnetic brake assembly 20 in the brake mechanism 1 may be assembled in the fishing reel main body 2, and the side cover assembly 30 is connected to the fishing reel main body 2.

Figure 7:
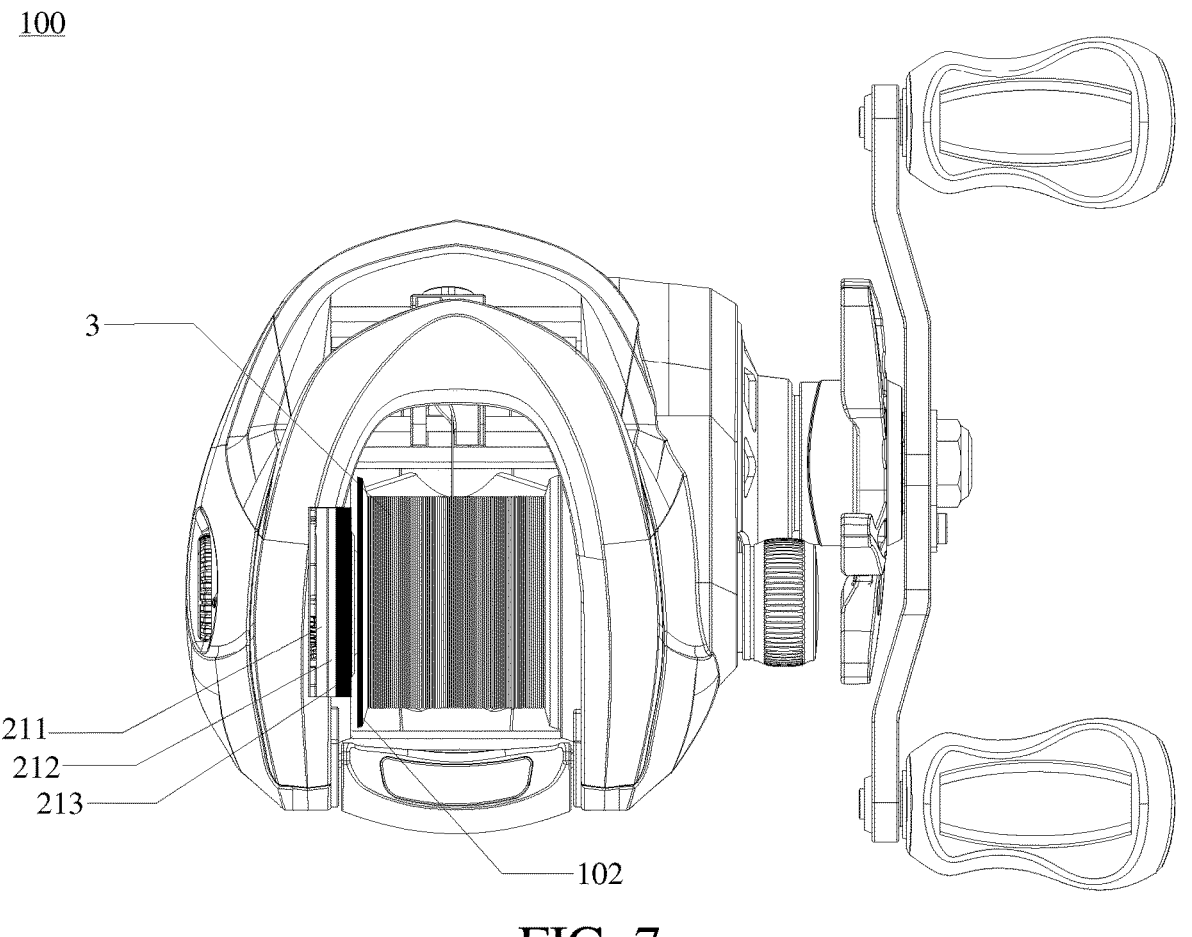
FIG. 7 is a partial schematic cross-sectional view of a brake mechanism is in an original state in the bait casting reel shown in FIG. 6.
Figure 8:
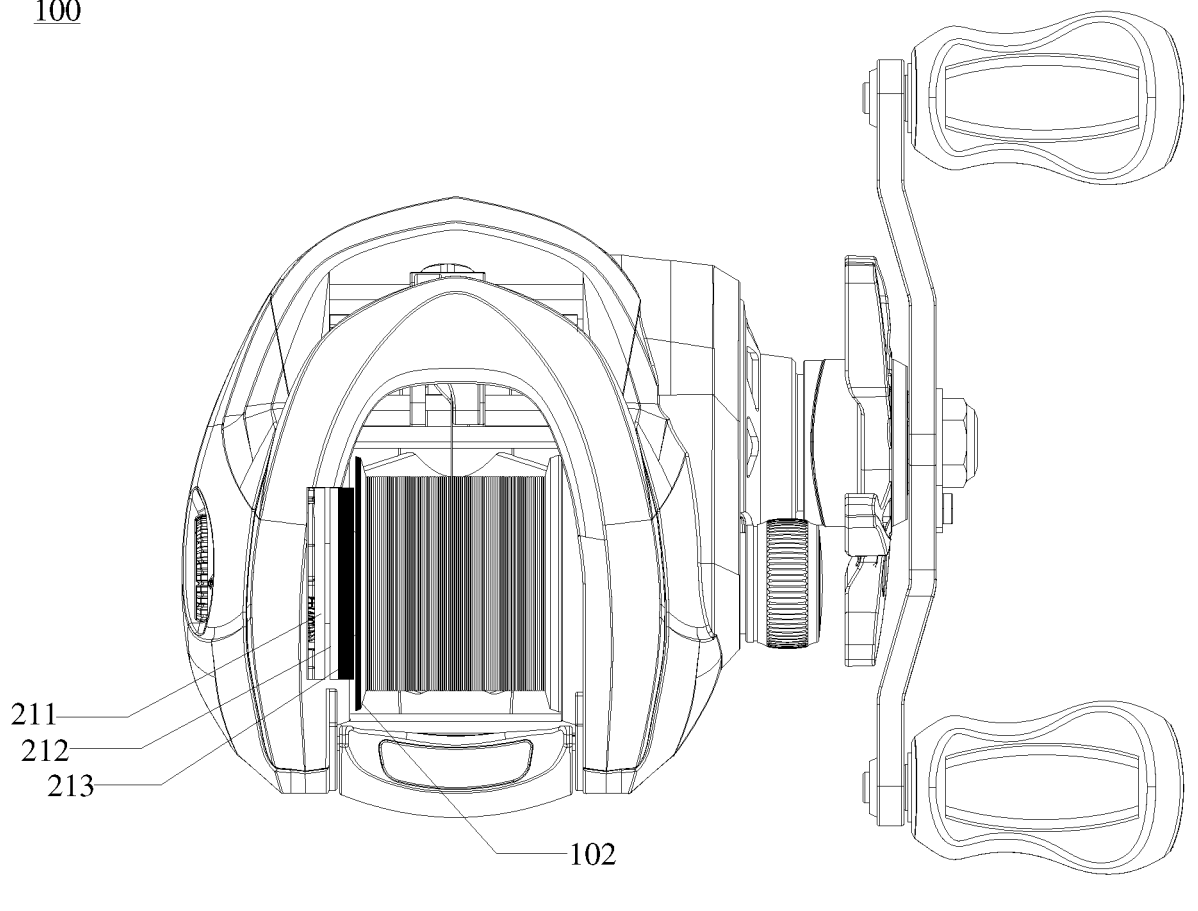
FIG. 8 is a partial schematic cross-sectional view of a brake mechanism is in a working state in the bait casting reel shown in FIG. 6.

Referring to FIG. 7 and FIG. 8, FIG. 7 and FIG. 8 respectively show different usage states of the bait casting reel 100 after wrapped with a fishing line 3. Initially, as shown in FIG. 7, in the present application, a set distance is maintained between the magnet 213 in the brake mechanism 1 and the end surface 102 of the wire wheel 10. In an early stage of the casting process, when the wire wheel 10 rotates rapidly, the annular magnet 213 tends to follow the rotation of the wire wheel 10 under an action of the electromagnetic force that is opposite to the Loren magnetic force. When the electromagnetic force received by the magnet 213 is greater than the thrust of the elastic member 221, the magnet frame 212 rotates along the contour of the convex part 2221 and undergoes axial displacement, so that the magnet 213 attracted to the magnet frame 212 is close to the end surface 102 of the wire wheel 10 (as shown in FIG. 8), and the intensity of the magnetic induction line that can be cut by the end surface 102 of the wire wheel 10 is enhanced, thereby providing greater braking force. In this way, the rotational speed of the wire wheel 10 is automatically fine-tuned to maintain a dynamic balance with the braking force, thereby effectively preventing that the fishing line birds nest occurs due to the excessive rotation of the wire wheel 10.

In addition, the present application further provides a fishing tackle including the bait casting reel 100. In the fishing tackle, other structures than the bait casting reel 100 may be the same as structures of a common fishing tackle in the conventional technology. For example, a fishing rod, and a fishing line may be provided. Structures of the fishing tackle are well known to a person skilled in the art and details are not be described herein.

The foregoing descriptions are merely preferred embodiments of the present application, and are not intended to limit the present application in any form. A person skilled in the art can apply various equivalent changes and improvements based on the foregoing embodiments, and any equivalent change or modification made without departing from the scope of the claims shall fall within the protection scope of the present application.

What is claimed is:

1. A brake mechanism, comprising:
a wire wheel; and
a magnetic brake assembly, disposed at one end of the wire wheel, and comprising a magnet assembly and a centrifugal adjustment assembly, wherein the magnet assembly is configured to generate a magnetic induction line, and the centrifugal adjustment assembly is configured to automatically adjust a distance between the magnet assembly and an end surface of the wire wheel based on a rotational speed of the wire wheel to adjust a range of the wire wheel cutting the magnetic induction line, to automatically adjust a braking force;
wherein the centrifugal adjustment assembly comprises an elastic member and a cam, the magnet assembly comprises a magnet base, a hollow magnet frame, and a magnet disposed on the magnet frame, at least one sliding groove is provided on a top surface of the magnet base, the cam is disposed in a lower middle part of the magnet base, and a convex part of the cam abuts against an inner wall of the magnet frame, an upper part of the magnet frame is movably disposed in the sliding groove through the elastic member, so that the magnet frame moves along the convex part of the cam under an action of an electromagnetic force or an elastic force of the elastic member when the wire wheel rotates, causing the magnet to move in a direction close to or away from the end surface of the wire wheel.

2. The brake mechanism according to claim 1, wherein the cam is a spiral cam, at least one connecting post is provided on a top of the magnet frame, each connecting post is located in one sliding groove and is movable in the sliding groove, one end of the elastic member is connected to a side wall of the sliding groove, and another end is connected to the connecting post, the inner wall of the magnet frame is provided with a connection groove that matches a contour of the convex part of the cam, so that a groove wall of the connection groove moves along an edge of the convex part when the magnet frame rotates under the action of the electromagnetic force or the elastic force of the elastic member.

3. The brake mechanism according to claim 2, wherein a quantity of the elastic members, the connecting posts, and the sliding grooves are all three, the three sliding grooves are disposed around a center of a circle of the magnet base, and each connecting post is movably disposed in one sliding groove through the elastic member.

4. A bait casting reel, comprising a fishing reel main body and a brake mechanism connected to the fishing reel main body, wherein the brake mechanism is the brake mechanism according to claim 3.

5. A fishing tackle, comprising the bait casting reel according to claim 4.

6. A bait casting reel, comprising a fishing reel main body and a brake mechanism connected to the fishing reel main body, wherein the brake mechanism is the brake mechanism according to claim 2.

7. A fishing tackle, comprising the bait casting reel according to claim 6.

8. The brake mechanism according to claim 1, wherein the magnet assembly further comprises at least one magnet suction piece, the magnet suction piece is fixed on the magnet frame and attracted to a top of the magnet.

9. The brake mechanism according to claim 8, wherein the magnet suction piece comprises an attracting part, two extension plates formed by extending upward from both ends of the attracting part, and two mounting plates formed by bending outward from outer sides of the extension plates, the magnet frame is provided with at least one mounting groove, the attracting part of the magnet suction piece passes through the mounting groove and is attracted to the top of the magnet, and the two mounting plates are located on a top surface of the magnet frame.

10. A bait casting reel, comprising a fishing reel main body and a brake mechanism connected to the fishing reel main body, wherein the brake mechanism is the brake mechanism according to claim 9.

11. A bait casting reel, comprising a fishing reel main body and a brake mechanism connected to the fishing reel main body, wherein the brake mechanism is the brake mechanism according to claim 8.

12. The brake mechanism according to claim 1, wherein the centrifugal adjustment assembly further comprises a cam cover, the magnet base comprises a base body and a connecting body extending downward from a middle of one side of the base body, the sliding groove is provided on the base body, the cam is located on the connecting body, and the cam cover is provided on the cam and is fixed on the connecting body through screws.

13. A bait casting reel, comprising a fishing reel main body and a brake mechanism connected to the fishing reel main body, wherein the brake mechanism is the brake mechanism according to claim 12.

14. The brake mechanism according to claim 1, wherein the brake mechanism further comprises a side cover assembly, the magnetic brake assembly is disposed on the side cover assembly, and a rotating shaft of the wire wheel passes through the magnet assembly and is disposed in the side cover assembly.

15. A bait casting reel, comprising a fishing reel main body and a brake mechanism connected to the fishing reel main body, wherein the brake mechanism is the brake mechanism according to claim 14.

16. A bait casting reel, comprising a fishing reel main body and a brake mechanism connected to the fishing reel main body, wherein the brake mechanism is the brake mechanism according to claim 1.

17. A fishing tackle, comprising the bait casting reel according to claim 16.

* * * * *